J. L. MALM.
ZINC CELL.
APPLICATION FILED JULY 29, 1914.
1,284,403.
Patented Nov. 12, 1918.
2 SHEETS—SHEET 2.
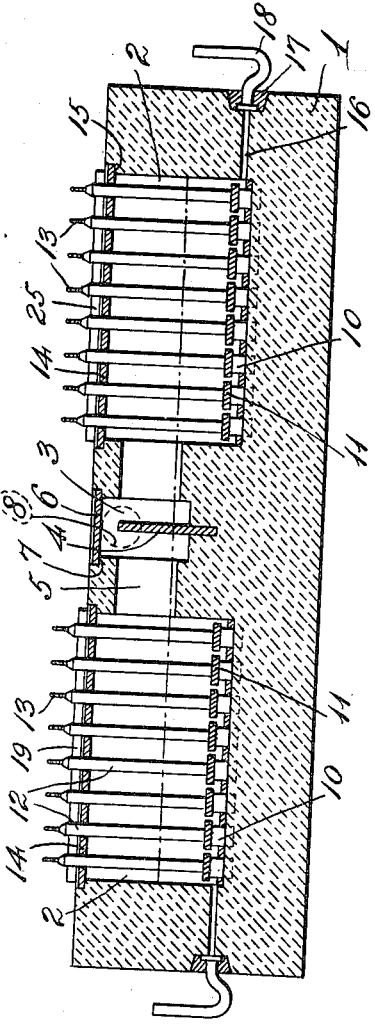
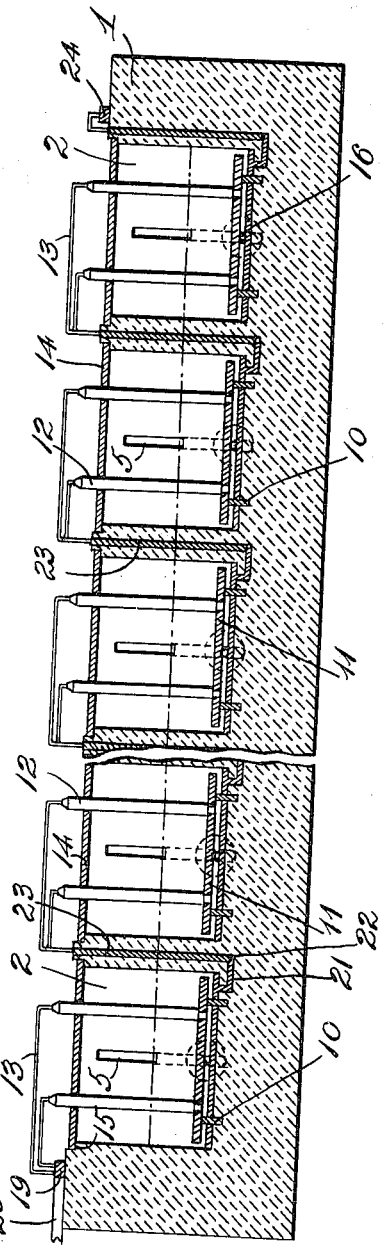
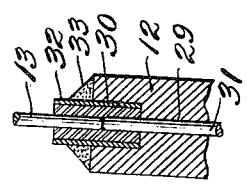

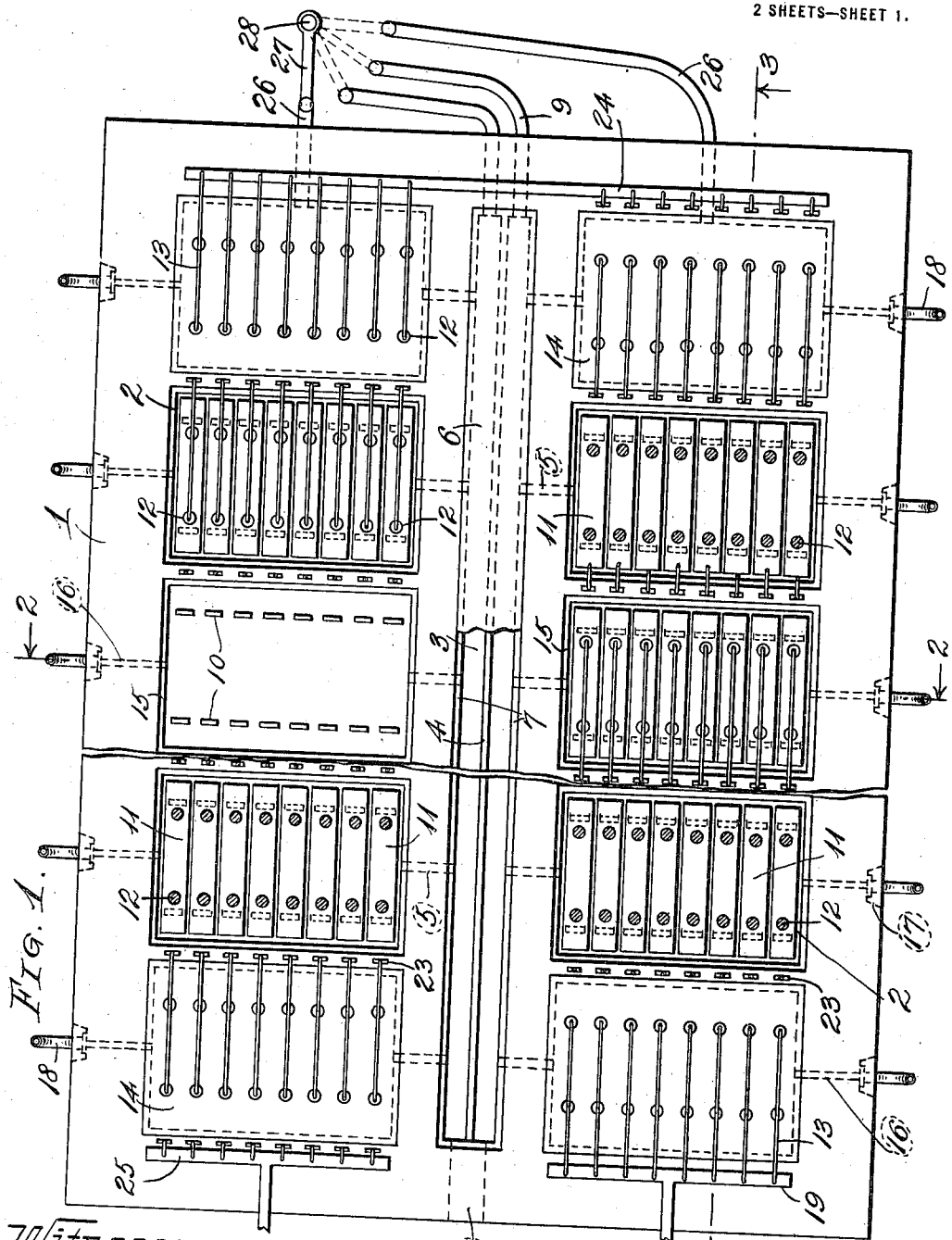

UNITED STATES PATENT OFFICE.

JOHN L. MALM, OF DENVER, COLORADO.

ZINC CELL.

1,284,403.   Specification of Letters Patent.   Patented Nov. 12, 1918.

Application filed July 29, 1914. Serial No. 853,859.

*To all whom it may concern:*

Be it known that I, JOHN L. MALM, a citizen of the United States, residing at Denver, in the county of Denver and State of Colorado, have invented certain new and useful Improvements in Zinc Cells, of which the following is a specification.

This invention relates generally to metallurgical apparatus and particularly to electrolytic cells utilized in treating metallic salts to liberate gas.

More specifically the invention relates to a battery of cells wherein the electrolyte is supplied in molten form to the several cells where it is treated electrically to drive off the anion and deposit the metal.

The invention may be further briefly summarized as consisting in the construction and combination of parts hereinafter set forth in the following description, drawings and claims.

Referring to the drawings, Figure 1 is a top plan view of a battery of cells constructed according to my invention; Fig. 2 is a transverse section upon the line 2—2 of Fig. 1; Fig. 3 is a longitudinal section upon the line 3—3 of Fig. 1; and Fig. 4 is a detail view showing the connections between leads and the graphite bars.

In carrying out the invention any preferred form and arrangement of parts may be employed so long as they possess the necessary characteristics, but I have shown one arrangement which is effective, and in such embodiment 1 represents a suitable casing of concrete or other material, provided with a plurality of cell chambers 2 arranged on each side of a longitudinal trough or opening 3 provided with a vertical partition 4 for a purpose to be described. This trough is connected to each cell chamber by a suitable port 5. This trough is provided with a suitable cover 6 resting on ledges 7 surrounding the trough. The cover is adapted to prevent the escape of gas from the trough and at the end of the casing an opening 8 leads from this trough to any suitable connection for conducting away the gas as will later appear. At the opposite end of the trough suitable pipes of earthen ware or any other suitable material lead to the casing to supply the electrolyte at this point if desired.

The elements of all cells are the same, and the description of one will suffice for all. Mounted in the bottom of each cell are supporting blocks 10 of any suitable material and extending up from the bottom of the chamber and which these blocks are adapted to support are graphite anode bars or plates 11 extending transversely of the cell. There are preferably two blocks for each anode and there is a plurality of anodes in each cell, eight being shown in the drawings, and each of these graphite anodes is provided with a pair of graphite conductor bars 12, one being arranged near each end, and each of these bars is provided with a suitable lead 13 extending to a source of current supply.

Each cell is also provided with a suitable cover 14 provided with openings for receiving the several conductor bars 12 and these covers rest on suitable shoulders 15 and prevent the escape of gas through the top of the cell. At a point slightly above the bottom of each cell a suitable discharge port 16 is provided and these discharge ports extend out to a suitable recess 17 in the outer wall of the casing 1 and are there provided with a trap spout 18 partially in the form of a return bend with the bend down so that it will fill up with molten metal and form a seal.

The several cells are connected in series throughout, and the arrangement is such that adjacent to the first cell, which, in this instance, is the one at the lower left end of Fig. 1, the casing is provided with a bus bar 19 connected to the positive lead 20 from any suitable source of current supply, and to this bus bar are connected the several leads 13 leading to the several graphite conductor bars of the first cell. The current then passes from this bus bar through the leads 13 to the conductor bars and to the graphite anodes in the bottom of this cell. Current then passes through the molten electrolyte and is led to the next cell through a molten electrolyte channel 21 passing through from the bottom of the first cell to a vertical channel 22 passing up between the first and second cells. In each of these channels 22 are suitable copper rods or bars 23 which are connected to the leads 13 of the next cell. This construction is continued throughout each cell of the battery, as shown, to the last one, from whence the current leads from the copper bars or rods 23 to a negative bus bar 24, shown at the right end of the battery in Fig. 3. This bus-bar extends across the battery, as shown in Fig. 1, and conveys the current to the other set of cells from whence it passes out through the negative generator bus bar 25. At the right-hand end the entire battery may be provided with electrolyte inlet pipes 26 leading to the two end cells, and these pipes may be utilized in distributing the electrolyte to them.

The ends of each of the pipes 9 and 26 are turned upward and they are arranged in an arc of a circle, so that a semi-circular connection 27 may connect any one of them to a supply pipe 28.

The electrical connection between each lead 13 and the conductor bar is made in the following manner: The conductor bar is provided with a longitudinal opening 29 enlarged to form a cup-shaped recess 30 at the top. Extending into the opening 29 is a copper or other conducting rod 31 which extends into the cup-shaped recess as shown. Engaging the walls of the recess 30 is a metal sleeve 32 which projects above the upper end of the conductor bar and receives the end of the lead 13. This sleeve is held in place by a ring of cement 33 arranged upon the top of the bar and around the sleeve. The terminal or lead 13 is then electrically connected to the rod 31 by some adhering metal, such as solder, which is poured in molten form into the sleeve, thus electrically connecting the rod with the lead. If it should be desired to move any of the conductor bars, this may be readily accomplished by melting the solder with a torch when the lead 13 may be pulled therefrom.

Assuming that there is a supply of molten electrolyte to the pipe 28 and that the molten electrolyte has risen to a height in the cells just above the bottoms of the transverse openings 5, as shown in dotted lines in Fig. 2, and further assuming that the positive and negative generator or current supply connections are connected in the proper manner and that current is being supplied to the cell, the operation is such that the electrolytic action of the current through the molten electrolyte causes the anion to be liberated therefrom and molten metal to accumulate in the bottom of the cells, the gaseous anion passing to the top of the cells through the transverse openings 5 and into the top of the channel 3 from whence it passes through the opening 8 to any suitable collector, not shown.

The partition 4 serves to divide the trough 3 into two parts so that in case either set of cells are out of commission the use of the other set will not be interfered with, and more particularly to prevent a short circuit between opposite cells.

When molten metal appears at the open end of any of the discharge spouts 18 the operator knows that it is time for such metal to be drawn off, the molten metal in the bottom of the trap sealing the cell until such time as the metal should be drawn off.

Having described my invention, I claim:—

1. A cell for treating metallic salts comprising a casing having a cell chamber therein, a supply and gas channel, a port leading from said channel to the cell chamber, a port in the casing and leading from a point above the bath to a point below the surface thereof, an anode support arranged upon the bottom of the cell, an anode arranged upon said support, a connector extending from said anode beyond the top of the cell, an electrical connection outside of the cell leading to the anode, another electrical connection outside of the cell leading to a point below the surface of the bath in the port, and a cover for said cell.

2. In an apparatus for treating metallic salts, a casing having a plurality of rows of cell chambers, a trough in the casing between the rows of cell chambers, openings between the trough and cell chambers, a partition in the trough and providing separate supplies for the untreated material for the several cell chambers, a cover for said trough spaced from the top of said partition, means for leading gas from the top of said trough, electrodes in said chambers, and suitable electrical connections therefor.

In testimony whereof I affix my signature in presence of two witnesses as follows:

JOHN L. MALM.

Witnesses:
W. E. MALM,
S. A. IONIDES.